(12) United States Patent
Kirkhope et al.

(10) Patent No.: US 11,149,546 B2
(45) Date of Patent: Oct. 19, 2021

(54) CABLE HANDLING SYSTEM FOR LONGWALL MINING MACHINES

(71) Applicant: Caterpillar Global Mining Europe GmbH, Lünen (DE)

(72) Inventors: Euan Russell Kirkhope, Waratah (AU); Bradley Stanaway, Walkerston (AU)

(73) Assignee: Caterpillar Global Mining Europe GmbH, Lunen (DE)

(*) Notice: Subject to any disclaimer, the term of this patent is extended or adjusted under 35 U.S.C. 154(b) by 32 days.

(21) Appl. No.: 16/515,687

(22) Filed: Jul. 18, 2019

(65) Prior Publication Data
US 2020/0024943 A1    Jan. 23, 2020

(30) Foreign Application Priority Data
Jul. 23, 2018   (GB) ..................................... 1811959

(51) Int. Cl.
*E21C 35/04*    (2006.01)
*E21C 27/02*    (2006.01)
(Continued)

(52) U.S. Cl.
CPC ............ *E21C 35/046* (2013.01); *E21C 27/02* (2013.01); *E21C 29/02* (2013.01); *E21C 35/12* (2013.01); *E21C 35/24* (2013.01); *F16L 3/01* (2013.01)

(58) Field of Classification Search
CPC ........ E21C 31/12; E21C 35/046; E21C 27/02; E21C 29/02; E21C 35/12; E21C 35/24; F16L 3/01
See application file for complete search history.

(56) References Cited

U.S. PATENT DOCUMENTS 4,514,011 A * 4/1985 Lodwig ................ E21C 35/046
                                                            104/194
8,672,415 B2   3/2014 Neilson et al.
(Continued)

FOREIGN PATENT DOCUMENTS

| CN | 204113286 U | 1/2015 | |
| DE | 3934718 A1 * | 12/1990 | ............. H01B 7/041 |
| GB | 2214602 A | 9/1989 | |

OTHER PUBLICATIONS

Search Report for related United Kingdom Application No. 1811959.4; report dated Jan. 15, 2019.

*Primary Examiner* — Janine M Kreck
*Assistant Examiner* — Michael A Goodwin
(74) *Attorney, Agent, or Firm* — von Briesen & Roper, s.c.

(57) ABSTRACT

A cable handling system for a longwall mining machine is disclosed. The longwall mining machine includes a shearer configured to move along a pan line to mine material along a mine face. The cable handling system includes a service line configured to carry one or more supply lines to the shearer for facilitating shearer operation. Further, a plurality of interconnected trays accommodates the service line. Moreover, a controller is configured to determine a profile of the pan line; detect one or more parameters associated with the service line in relation to the profile of the pan line; and determine a likelihood of at least a portion of the service line dislodging from the plurality of interconnected trays based on the one or more parameters exceeding a predefined threshold.

20 Claims, 7 Drawing Sheets

(51) Int. Cl.
*F16L 3/01* (2006.01)
*E21C 29/02* (2006.01)
*E21C 35/12* (2006.01)
*E21C 35/24* (2006.01)

(56) References Cited

U.S. PATENT DOCUMENTS

| | | | |
|---|---|---|---|
| 2012/0082422 A1* | 4/2012 | Sarchi | G01K 11/32 385/101 |
| 2012/0187746 A1* | 7/2012 | Niederriter | G02B 6/4461 299/42 |
| 2014/0083075 A1* | 3/2014 | Hughes | F16G 13/18 59/78.1 |
| 2016/0123145 A1* | 5/2016 | Westphalen | E21C 35/08 299/1.6 |
| 2017/0275993 A1* | 9/2017 | Rimmington | E21C 25/10 |
| 2017/0314395 A1 | 11/2017 | Siegrist et al. | |

* cited by examiner

CABLE HANDLING SYSTEM FOR LONGWALL MINING MACHINES

TECHNICAL FIELD

The present disclosure generally relates to cable handling systems in longwall mining machines. More particularly, the disclosure relates to predicting a dislodgement of a service line of a cable handling system in a longwall mining machine.

BACKGROUND

Longwall mining machines generally include a shearer that traverses along an armored face conveyor (AFC) pan line to cut, extract, and obtain material, from a mine face. Lines supplying various requirements, including electrical power, may be extended to the shearer from a source. Generally, such lines are housed in a trailing cable handling system known as a bretby. The bretby is commonly constrained within a tray (or a plurality of trays) as part of the Longwall Pan line. As the shearer moves, the bretby is pulled and folded according to the direction of shearer travel, and during shearer operation, the bretby may be folded and stacked numerous times. As the stack of the bretby increases in height, so does the likelihood of the bretby escaping the tray. Such a condition is further complicated by undulations in the mining seam (and/or environment) that can cause relatively large changes in the pan angles of the pan line. When the stack is relatively high, or when the undulation is relatively large, at least a portion of the bretby may rise above a height of a side wall of the tray, and may fall out of the tray. With a bretby portion out of the tray, a remainder of the bretby may unravel out as well (owing to gravity, etc.). Such unraveling of the bretby may damage the bretby and/or may injure any personnel in the vicinity. Damage to the bretby is relatively expensive to repair, and, in most cases, a reportable incident to mine regulators.

SUMMARY OF THE INVENTION

In one aspect, the disclosure is directed towards a cable handling system for a longwall mining machine. The longwall mining machine includes a shearer configured to move along a pan line to mine material along a mine face. The cable handling system includes a service line, multiple interconnected trays, and a controller. The service line is configured to carry one or more supply lines to the shearer for facilitating shearer operation. The interconnected trays accommodate the service line. Further, the controller is configured to determine a profile of the pan line, and detect one or more parameters associated with the service line in relation to the profile of the pan line. The controller is configured to determine a likelihood of at least a portion of the service line dislodging from the interconnected trays based on the one or more parameters exceeding a predefined threshold.

In another aspect, the disclosure relates to a longwall mining machine. The longwall mining machine includes a pan line, a shearer, a service line, multiple interconnected trays, and a controller. The shearer is configured to move along the pan line to mine material along a mine face. The service line is configured to carry one or more supply lines to the shearer for facilitating shearer operation. The interconnected trays accommodate the service line. The controller is configured to determine a profile of the pan line. Further, the controller is configured to detect one or more parameters associated with the service line in relation to the profile of the pan line. The controller is also configured to determine a likelihood of at least a portion of the service line dislodging from the interconnected trays based on the one or more parameters exceeding a predefined threshold.

In yet another aspect the disclosure is directed to a method for operating a cable handling system of a longwall mining machine. The longwall mining machine includes a shearer movable along a pan line to mine material along a mine face. The cable handling system includes a service line configured to carry one or more supply lines to the shearer for facilitating shearer operation, and interconnected trays to accommodate the service line. The method includes determining, by a controller, a profile of the pan line based on a position and a movement of the shearer along the pan line. The method also includes detecting, by the controller, one or more parameters associated with the service line in relation to the profile of the pan line. Further, the method includes determining, by the controller, a likelihood of at least a portion of the service line dislodging from the interconnected trays based on the one or more parameters exceeding a predefined threshold.

DETAILED DESCRIPTION

Figure 1:
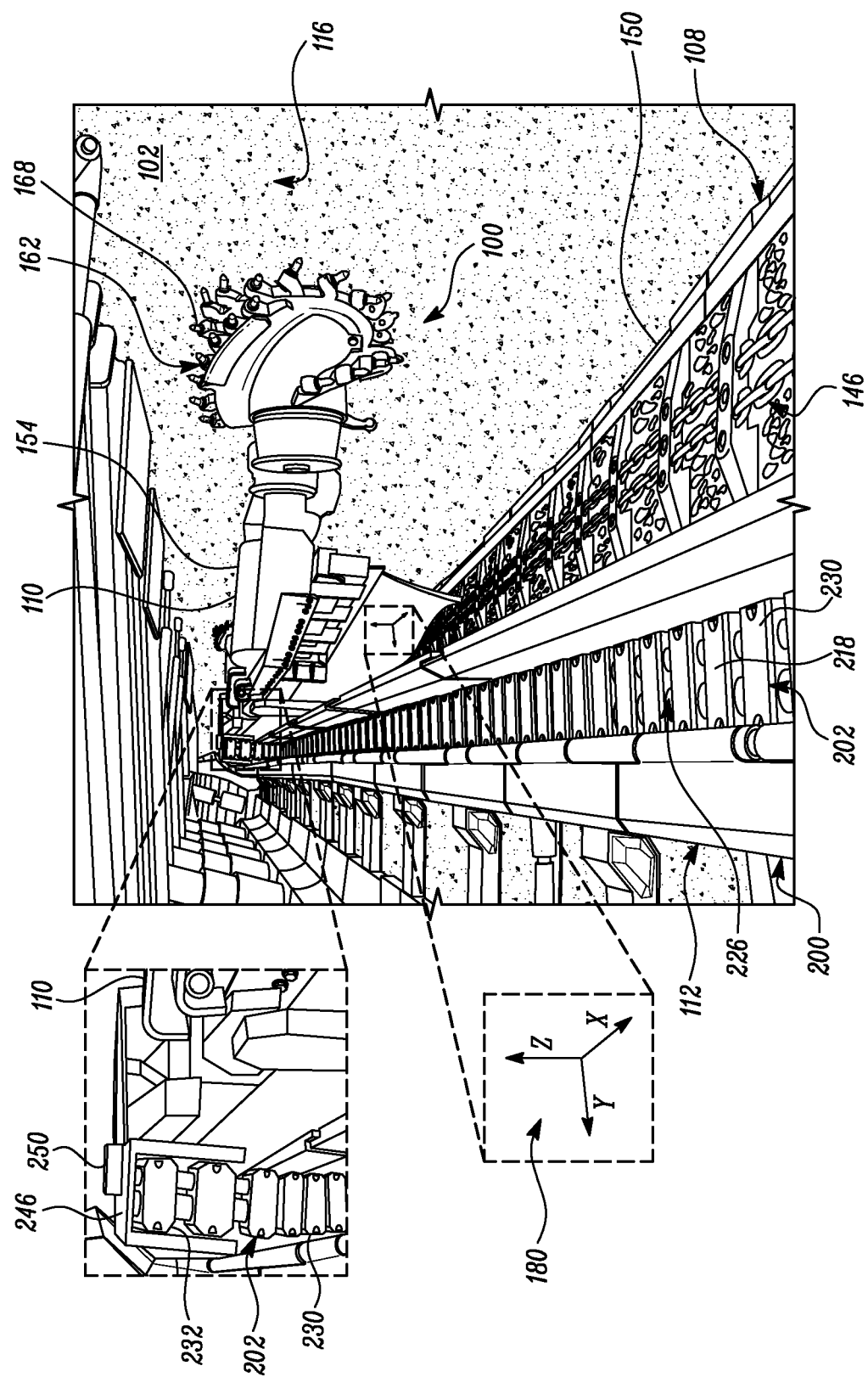
FIG. 1 is an exemplary longwall mining machine that includes a shearer movable along a pan line to extract material from a mine face of an underground mine, in accordance with an embodiment of the present disclosure.

Referring to FIG. 1, a longwall mining machine 100 is shown. The longwall mining machine 100 may be operated within an underground mine 102, as shown. In one example, the longwall mining machine 100 may be used to mine materials, such as coal. Nevertheless, aspects of the present disclosure may be applied to other environments, and may not be limited to the environment set forth in the following description and/or drawings. The longwall mining machine 100 may include a face conveyor 108, a shearer 110, and a cable handling system 112.

Figure 2:
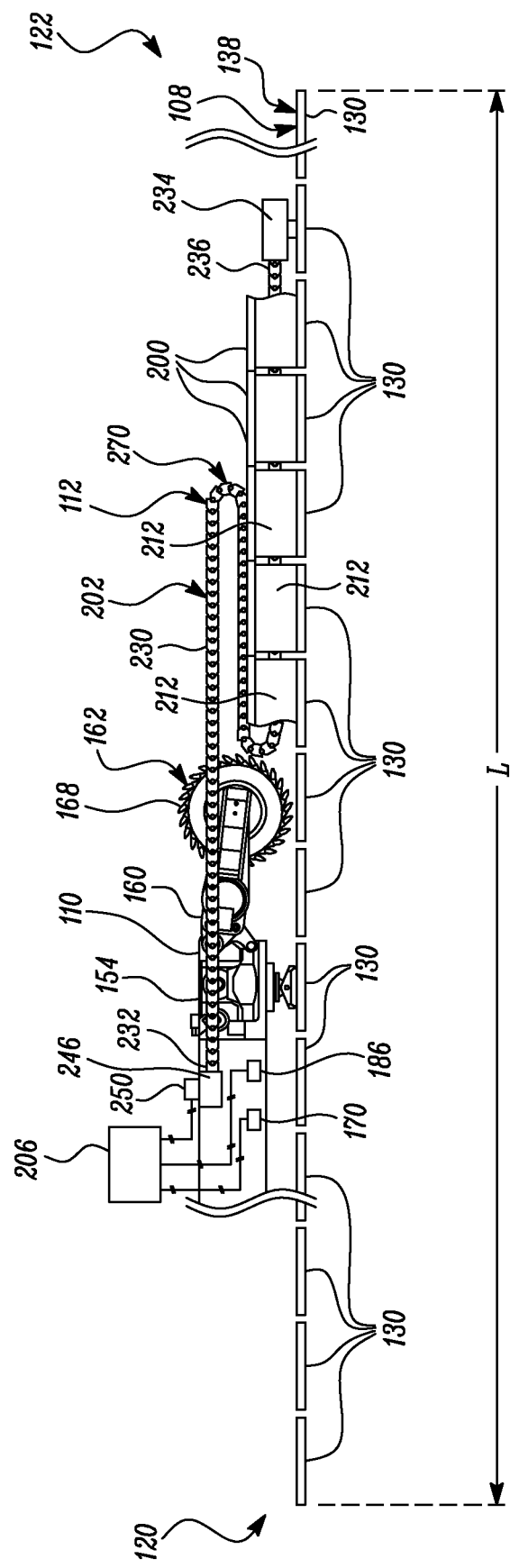
FIG. 2 is a diagrammatic view of interconnected trays defined along the pan line with a service line for the shearer being disposed within the interconnected trays, in accordance with an embodiment of the present disclosure.

Referring to FIGS. 1 and 2, the face conveyor 108 may be an armored face conveyor, and may be disposed and extended along a longwall face or a mine face 116 of the underground mine 102. For example, the face conveyor 108 may extend between a main gate end 120 and a tail gate end 122 (see FIG. 2) of the underground mine 102. The face conveyor 108 may include multiple face conveyor segments, referred to as pans 130. Adjacent pans 130 may be coupled to one another, and multiple interconnected pans 130 may define a pan line 138 of the longwall mining machine 100. In one example, the pan line 138 may be arranged in-between two stations, which may respectively accommodate sprockets and similar arrangements to help redirect an endless conveyor chain 146 of the face conveyor 108 along a cyclical path, as is commonly found in conveyor mechanisms. In that manner, the face conveyor 108 is able to transport material extracted and dropped from the mine face 116 to a suitable location. An operation of the endless conveyor chain 146 may be powered by one or more drives (commonly referred to a main drive and/or an auxiliary drive) (not shown). In some embodiments, the face conveyor 108 includes a guide rail 150 defined along a length, L, (see FIG. 2) of the pan line 138. The guide rail 150 may facilitate a movement of the shearer 110 along the pan line 138.

The shearer 110 may be configured to shear material, such as coal, as already noted above, from the mine face 116. To this end, the shearer 110 may be guided on the guide rail 150, and, accordingly, may be traversable over and along the guide rail 150, along the length, L, of the pan line 138. In some embodiments, during said travel, the shearer 110 may shear material from the mine face 116. The shearer 110 includes a generally elongated, main body 154, with an end 160 and a first shearer arm assembly 162 that is coupled and moveable relative to the end 160. The shearer 110 may include a similarly arranged, second arm assembly (not shown), which may be coupled and movable to an opposite end (not shown) of the main body 154. The first shearer arm assembly 162 may include a cutting drum 168 that may be moved to engage the mine face 116, and/or may be rotated about an axis upon engagement with the mine face 116. In that manner, the cutting drum 168 may help shear and extract material from the mine face 116. A similar cutting drum (not shown) may be provided on the second arm assembly.

Shearer 110 is further equipped with an orientation sensor 170, such as an inertial navigation system (INS), that is configured to detect an orientation (e.g., yaw, roll, pitch, or an angular alignment) of the shearer 110 vis-à-vis the pan line 138. To understand the aspect of shearer orientation (e.g., yaw, roll, pitch of the shearer 110 vis-à-vis the pan line 138), a 3-dimensional co-ordinate system 180, as marked in FIG. 1 relative to the shearer 110, is explicitly referenced. The 3-dimensional co-ordinate system 180 includes an X-axis, a Y-axis, and a Z-axis. It may be noted that the Z-axis is a vertical axis (i.e., defined along an elevation) of the shearer 110; the X-axis is a horizontal axis (i.e., defined along the length, L, of pan line 138), and is perpendicular to the Z-axis; the Y-axis is perpendicular to both the X-axis and the Z-axis and may pass through a point of intersection of the X-axis and the Z-axis. For the purposes of the present disclosure, a yaw of the shearer 110 may mean a tilting of the shearer 110 about the Z-axis; a roll may mean a tilting of the shearer 110 about the X-axis; and a pitch may mean a tilting of the shearer 110 about the Y-axis.

Additionally, or optionally, the shearer 110 may be equipped with a position sensor 186 (or one or more position sensors) that may help determine a position of the shearer 110 on and along the pan line 138. For example, a distance moved by the shearer 110 from a point, such as from the main gate end 120 or from a tail gate end 122 may be gauged by receiving an input from the position sensor 186. Further, input from the position sensor 186 may also be used to determine a speed and a direction of shearer movement along the pan line 138. According to one aspect of the present disclosure, an orientation of the shearer 110, as determined by the orientation sensor 170, and a position of the shearer 110, as determined by the position sensor 186, may be used to measure and determine a profile of the pan line 138.

Figure 6:
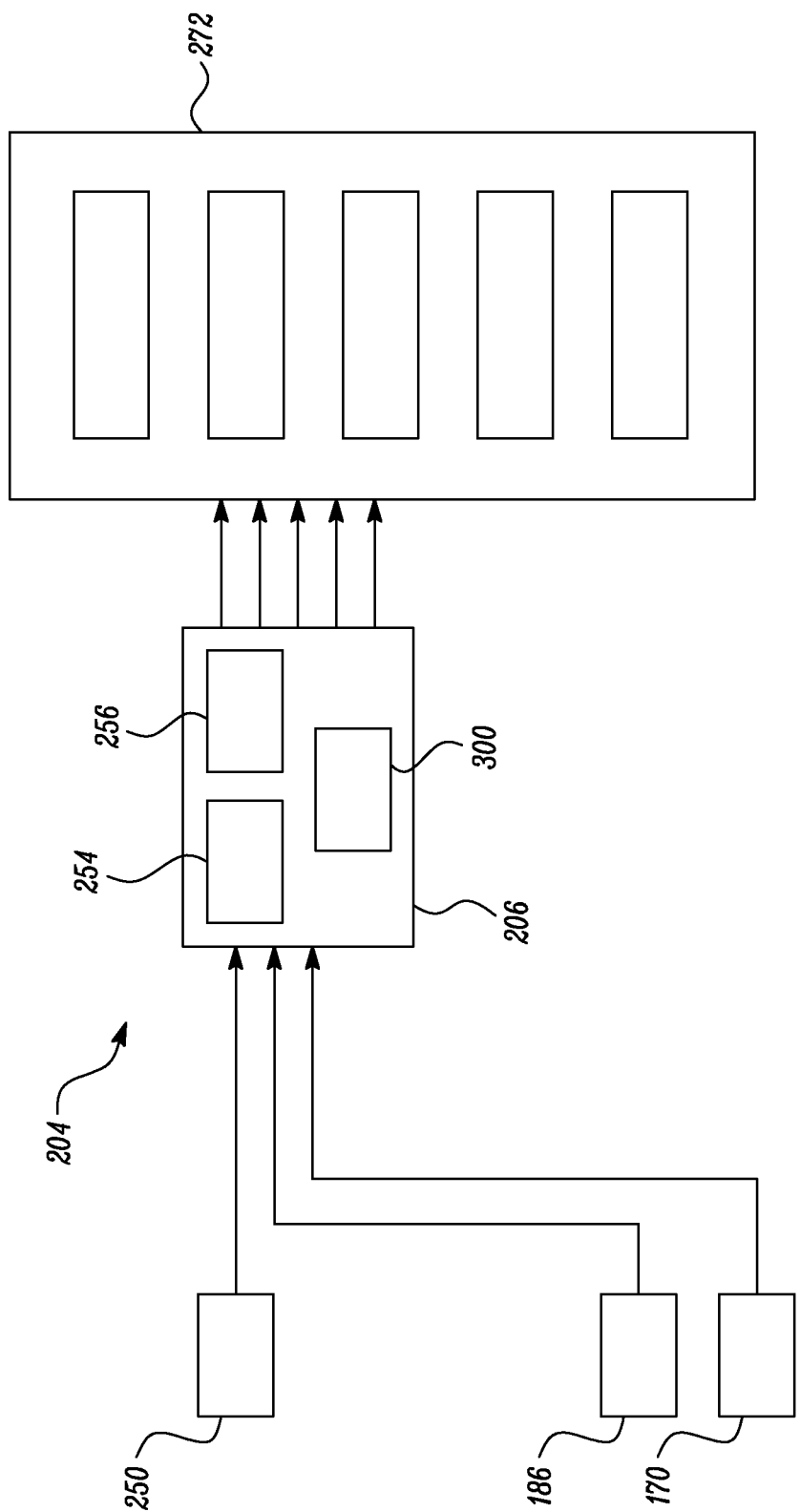
FIG. 6 is a schematic view of a control system associated with a cable handling system of the longwall mining machine, in accordance with yet another embodiment of the present disclosure.

For enabling an effective operation of the shearer 110 and to perform one or more of the aforementioned shearer functions, such as of moving along the pan line 138, operating the cutting drums (e.g., cutting drum 168), shearing the material from the mine face 116, etc., services such as power, plumbing, and the like, need to be provided to the shearer 110. The cable handling system 112 facilitates the supply of such services to the shearer 110. The cable handling system 112 includes a number of interconnected trays 200, a service line 202 that is passed through the interconnected trays 200 to the shearer 110, and a control system 204 (see FIG. 6) having a controller 206 to control one or more aspects of the cable handling system 112.

The interconnected trays 200 may be mounted on the pan line 138. As an example, each tray 200 may include a base wall 210, and two upstanding, side walls 212, 214 extending from the base wall 210 (best shown in FIG. 5). Further, a cavity 218 may be defined between the side walls 212, 214, and the base wall 210. For example, one tray 200 may be coupled or arranged (e.g., integrally) with one pan 130, and when each pan 130 is assembled with the other pan 130 to form and define the pan line 138, one tray 200 may lie in registration with an adjacent tray 200. In so doing, the cavities (such as cavity 218) of each tray 200 may combinedly define a service trough 226 along the length, L, of the pan line 138, within which the service line 202 may be freely disposed. In that manner, the interconnected trays 200 are adapted to receive, accommodate, and provide passage for the service line 202, therethrough. Further, the service trough 226 may follow a profile of the pan line 138—this means that as a profile of the pan line 138 within the underground mine 102 may follow the undulations, curves, bends, highs, and lows of the profile of the underground mine 102, so may the cumulative arrangement of the interconnected trays 200 (i.e., the profile of the service trough 226) define and follow the same profile as that of the pan line 138.

The service line 202 may be configured to carry one or more supplies to the shearer 110 for facilitating shearer operation. For example, the service line 202 may include a bretby type cable handler (or simply a cable handler 230) that may be disposed within and through the service trough 226, and which may in turn hold and/or facilitate passage and routing for electrical cables, fluid lines, data and communication lines, and the like, therethrough. As an example, said electrical cables, fluid lines, data, communication lines, and the like, may extend from a source (not shown) to the shearer 110 for facilitating shearer operation. In some cases, the cable handler 230 may be fixedly coupled to the main body 154 of the shearer 110 at one end (or at a first end 232), and may be fixedly coupled to a midway region (such as to a sub-frame 234) of the pan line 138 (see FIG. 2), at another end (or at a second end 236).

In one example, the shearer 110 may include a tow bracket 246, and the first end 232 of the cable handler 230 may be operably coupled to the tow bracket 246. In so doing, the shearer 110 may receive the various inputs (from the source) required for performing the shearer operation along the mine face 116 via a connection defined by the tow bracket 246. Further, owing to shearer movement, the cable handler 230 may be moveable as well. In one example, portions of the cable handler 230 may be folded and stacked layer-by-layer, one over the other, multiple times during shearer operations. To accommodate such bends and folds, the cable handler 230 may be built to generally flex along its length.

According to one aspect of the present disclosure, the cable handling system 112 includes a strain gauge, or a strain sensor 250. As an example, the strain sensor 250 may be mounted to the tow bracket 246, and may be configured to detect a strain sustained by (or exerted on) the service line 202 (or by the cable handler 230) during a movement (e.g., pull and/or push) of the shearer 110 along the pan line 138. As an example, the strain sensor 250 may be a device that may exhibit a property change (such as resistance change) based on a load or a force applied on the service line 202. Such property change may be measurable by using a Wheatstone bridge principle, and the like, and thus may become the reason for a strain signal generation by the strain sensor 250. Other sensor types, configured for detecting strain, may be applied as well.

The controller 206 may be communicably coupled to each of the orientation sensor 170, the position sensor 186, and the strain sensor 250. In that manner, the controller 206 may be able to receive input from each of the orientation sensor 170, the position sensor 186, and the strain sensor 250. For example, the controller 206 may receive data pertaining to the pitch, roll, and yaw, of the shearer 110, from the orientation sensor 170; data pertaining to each of a position of the shearer 110 and/or a distance traversed by the shearer 110, from the position sensor 186; and data pertaining to the strain sustained by the tow bracket 246, from the strain sensor 250.

In an exemplary embodiment, based on the input from the orientation sensor 170 (for example, of a data corresponding to the roll of the shearer 110 and a data corresponding to the pitch of the shearer 110) and based on the input from the position sensor 186 (for example, of a data corresponding to a position and movement of the shearer 110), the controller 206 may be able to process and determine a profile of the pan line 138. To this end, the controller 206 may include a processor 254 that may process the aforementioned sensor input, and may accordingly help determine the profile of the pan line 138. In one example, to determine the profile of the pan line 138, the controller 206 may generate a shearer path by computing an elevation profile (i.e., vector of shearer height changes along Z-axis) and pitch profile (i.e., vector of shearer distance changes about Y-axis) using the data/input from both the orientation sensor 170 and the position sensor 186. The shearer path may help define a terrain map in 3D space. The terrain map may represent the orientation of each pan 130, and may thus facilitate the generation of the profile of the pan line 138.

Since the service trough 226 may follow a profile of the pan line 138, the controller 206 may determine that a profile of the service trough 226 (i.e., interconnected trays 200) is the same as that of a profile defined by the pan line 138. Further, for each shear cycle, which may refer to a completion of shearer operation from the main gate end 120 to the tail gate end 122 (or conversely, from the tail gate end 122 to the main gate end 120), the controller 206 may store the corresponding profile vectors in a memory 256, thus defining a (pan line) profile vector history.

Having detected the profile of the pan line 138 (or the profile of the interconnected trays 200), the controller 206 may be able to detect one or more parameters associated with the service line 202 (or the cable handler 230) in relation to the profile of the pan line 138. Each of the parameters may help detect a state or a condition of the at least a portion of the service line 202 (or the cable handler 230), and based on the state or condition, the controller 206 may determine a likelihood or a possibility of (i.e., to pre-emptively predict) a dislodgement of at least a portion of the service line 202 from the interconnected trays 200. The controller 206 may be able to transfer the data corresponding such determination or prediction to a user, operator, supervisor, and the like, stationed either in situ or remote to the longwall mining machine 100.

According to one or more aspects of the present disclosure, the controller 206 determines the likelihood of such dislodgement based on one or more of the parameters exceeding a predefined threshold (or a predefined parameter threshold). In an embodiment, the parameters may include at least one of a variation in a span, S, of the service line 202 relative to a corresponding part, P, of the pan line 138 (see FIG. 3); an elevation of at least a portion of the service line 202 above a portion of the interconnected trays 200 (see FIG. 3); a value of skew of the service line 202 relative to the pan line 138 (see FIG. 4); an angle of twist of the service line 202 relative to the pan line 138 (see FIG. 5); and a number of layers formed by a stack 270 of the service line 202 at any point during shearer movement (see FIG. 2). Details pertaining to the concept and computation of these parameters, and their exceeding a corresponding predefined threshold, indicating the likelihood of service line dislodgement, have been discussed later in the present disclosure.

In some embodiments, the cable handling system 112 (or the control system 204) may include an output device 272 by which the controller 206 may notify of the likelihood of service line dislodgement. For example, the output device 272 may be coupled to or may include an audible means, a visual means, or a combined audio-visual means to alert one or more workers in situ, such as the ones stationed in the vicinity of the service line 202, or one or more remotely managing machine operators and supervisors. In an embodiment, the output device 272 is an operator/supervisor workstation or a portable device by which an operator may readily be able to gather the working of the cable handling system 112 and the likelihood of service line dislodgement from the interconnected trays 200.

The controller 206 may be connected to the longwall mining machine's electronic control module (ECM) (not shown), such as a safety module or a dynamics module, or may be configured as a stand-alone entity. Optionally, the controller 206 may be integral and be one and the same as the ECM. The controller 206 may include a set of volatile memory units such as a random-access memory (RAM)/a read-only memory (ROM), which include associated input and output buses. More particularly, the controller 206 may be envisioned as an application-specific integrated circuit, or other logic devices, which provide controller functionality, and such devices being known to those with ordinary skill in the art. Exemplary arrangements of the controller 206 may include the controller accommodation within certain machine panels or portions from where the controller 206 may remain accessible for ease of use, service, and repairs.

Examples of the processor 254 include, but are not limited to, an X86 processor, a Reduced Instruction Set Computing (RISC) processor, an Application Specific Integrated Circuit (ASIC) processor, a Complex Instruction Set Computing (CISC) processor, an Advanced RISC Machine (ARM) processor or any other processor. Examples of the memory 256 may include a hard disk drive (HDD), and a secure digital (SD) card.

INDUSTRIAL APPLICABILITY

During operation, it may be assumed that the service line 202 is disposed generally flat within the interconnected trays 200 and defines a single layer from the sub-frame 234 to the main gate end 120, for example, when the shearer 110 has moved to the farthest extents of the pan line 138 (i.e., all the way to an end stop position defined proximate to the main gate end 120). At such a shearer position, the service line 202 may form a single layer of stack within the interconnected trays 200.

As the shearer 110 leaves the main gate end 120, the service line 202 may invert direction, thereby creating a turn in the service line 202. As the shearer 110 moves further, the turned service line portion may move as well, laying and traversing atop a first (underlying) layer of the service line 202, and may accordingly define a second layer in the stack 270 of the service line 202. The created turn may follow behind the shearer 110. Due to the typical cutting sequence in the longwall mining machine 100, the shearer 110 may often change its direction before completing a shear cycle, and may repeatedly travel back-and-forth across the mine face 116. In some cases, accordingly, as the shearer 110 direction may again be reversed, the service line 202 may again create further turns, and, accordingly, on every such turn, the service line 202 may increment the count of the layer forming the stack 270. In some embodiments, the controller 206 may include a stack layer counter 300 (see FIG. 6) that may determine the number of layers formed in a stack of the service line 202.

In some embodiments, the controller 206 (or the stack layer counter 300) may seek input from the position sensor 186 to track the location of each stack increment (service line turn), and may accordingly know and maintain the length of each layer in the stack 270. In any case, as the shearer 110 moves away from the stack 270 in the direction of shearer travel, the layers of the stack 270 may be consumed from a highest layer to a lowest layer.

The aforementioned operational aspect describes a general working of the shearer 110 along the pan line 138. During such operation of the shearer 110, and in light of profile of the pan line 138 (that may include bends, curves, etc.), and a typical pattern of shearer operation as discussed above, it may become possible for the service line 202 to dislodge and escape from the interconnected trays 200, at any given point. Certain aspects of the present disclosure are set to determine the possibility of such dislodgement and escape, and to determine such possibility, the various parameters noted above are monitored. If any parameter is found to have exceeded a corresponding predefined threshold, it may be determined that the service line 202 is about to dislodge and or escape the interconnected trays 200. According to an aspect, the controller 206 is configured to perform a set of steps to predict and/or determine the possibility of service line dislodgement and escape from the interconnected trays 200. The set of steps will be discussed now.

Figure 7:
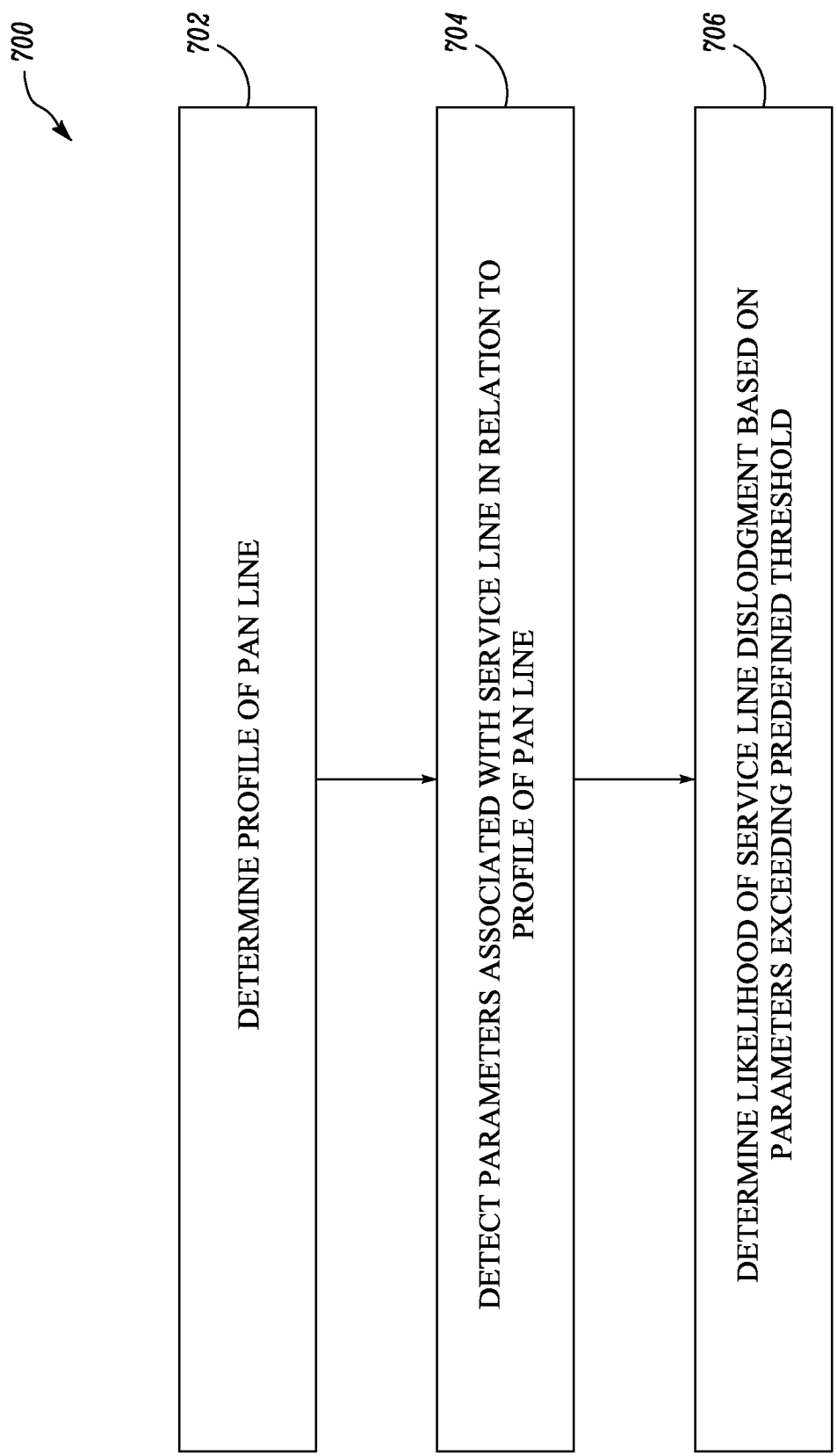
FIG. 7 is an exemplary method for operating the cable handling system, in accordance with yet another embodiment of the present disclosure.

Referring to FIG. 7, the steps are discussed by way of a method 700. According to a first step 702 of the method 700, the controller 206 is configured to first determine a profile of the pan line 138. This is because a profile of the pan line 138 also corresponds to a profile of the interconnected trays 200, and thus forms the basis for determining the profile of the service trough 226 in which the service line 202 is laid. Upon determining the profile of the pan line 138, at second step 704, the controller 206 determines one or more parameters associated with the service line 202 in relation to the profile of the pan line 138. Thereafter, at third step 706, the controller 206 determines a likelihood of at least a portion of the service line 202 dislodging from the interconnected trays 200 if one or more parameters were to exceed a predefined threshold.

The forthcoming disclosure includes discussions pertaining to the parameters, exemplary methodologies followed by the controller 206 to compute the parameters, and the adjudgment of the parameters by the controller 206 based on which the likelihood of service line dislodgement is determined.

Figure 3:
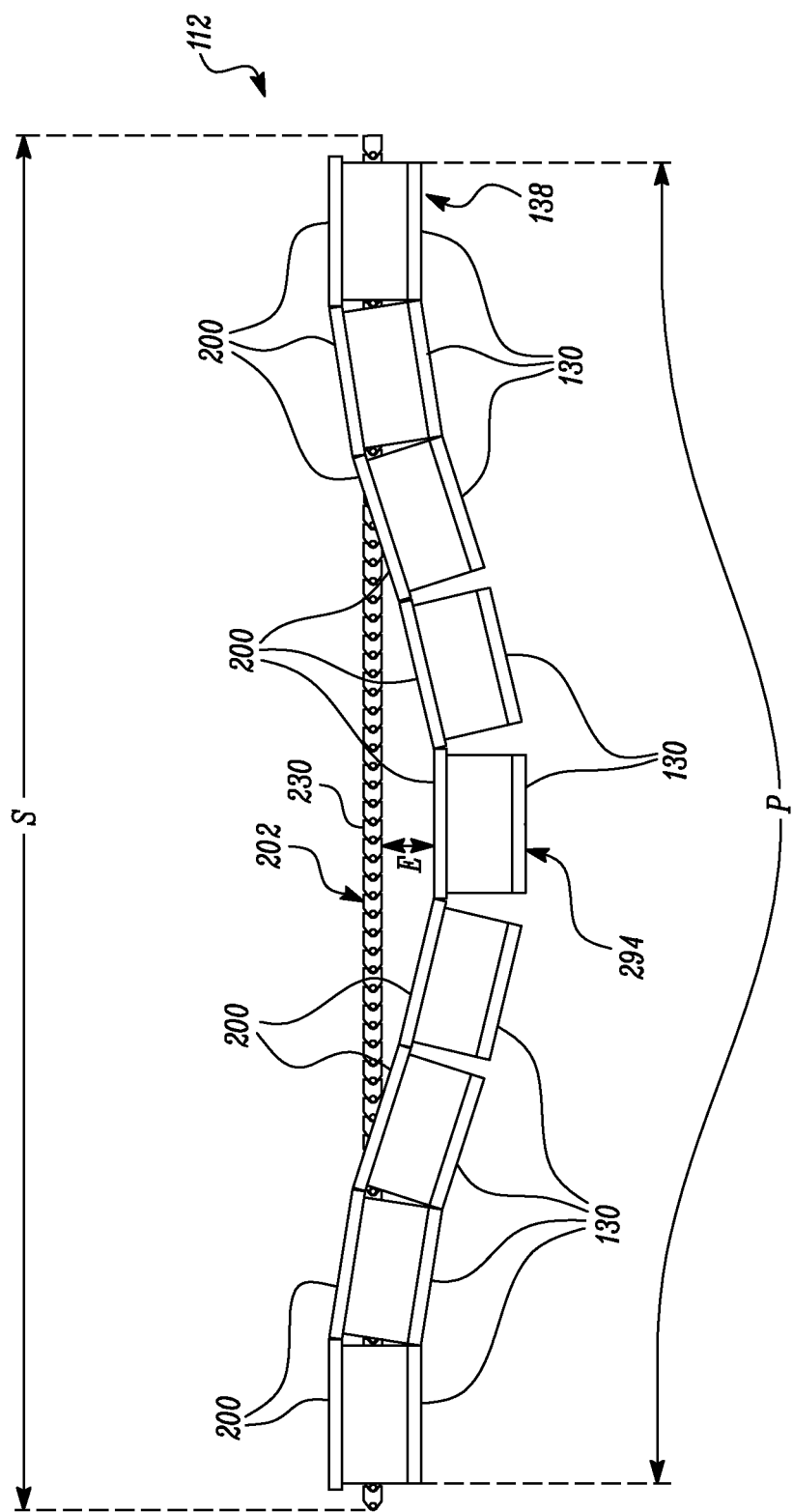
FIGS. 3 to 5 are diagrammatic views depicting various configurations of the service line vis-à-vis a configuration of the interconnected trays, in accordance with another embodiment of the present disclosure.

Referring to FIG. 3, and according to some embodiments of the present disclosure, the parameters of the service line 202 may include a variation in the span, S, of the service line 202 relative to a corresponding part, P, of the pan line 138. In principle, if the span, S, of the service line 202 were shorter in comparison to the corresponding part, P, of the pan line 138, the controller 206 may determine a likelihood of the service line 202 escaping from the interconnected trays 200 (or from the service trough 226 defined by the interconnected trays 200). In an exemplary working scenario, span, S, may range between the sub-frame 234 and the shearer 110. Accordingly, the controller 206 may determine a position and a distance of the shearer 110 relative to the sub-frame 234 by referring to the profile vector history of the pan line 138 and by referring to the shearer 110's position on the pan line 138. Ideally, the span, S, of the service line 202 extending from the sub-frame 234 to the shearer 110 may be determined to be same (or similar) as the distance defined by the pan line 138 between the sub-frame 234 and the shearer position—since the span, S, of the service line 202 is meant to be routed through the service trough 226 covering the same distance as that covered by the pan line 138 up to the shearer 110. However, the controller 206 may determine an actual length of the span, S, (computation discussed later below) from the sub-frame 234 up to the shearer position, and compare said actual length with a length of the corresponding part, P, of the pan line 138 through which the service line 202 should be ideally passed. If the actual length of the span, S, were determined to be smaller (i.e., to vary) than a minimum length (such as a predefined length threshold stored within the memory 256), the controller 206 may detect the variation and determine that the service line 202 is likely to dislodge and escape from the interconnected trays 200, and may accordingly, output a corresponding notification by the output device 272. In effect, when the actual length is too short (i.e., shorter than the minimum length) to accurately follow the (bending/curved/angled/twisted) (see example bend 294, FIG. 3) shape of the corresponding part, P, of the pan line 138, the controller 206 may indicate that the service line 202 is likely to escape and/or be dislodged from the interconnected trays 200.

To calculate and determine the actual length of the span, S, the controller 206 may utilize the strain data (that indicates the strain exerted on or sustained by the service line 202 or by the cable handler 230 at the first end 232 of the cable handler 230). Such data may be sourced from the strain sensor 250. For example, different values of strain may indicate different actual length of span, S, of the service line 202. Higher strain value may correspond to lower actual length of the span, S, of the service line 202, while lower strain value may correspond to higher actual length of the span, S, of the service line 202. To this end, charts and maps may be stored within the memory 256 of the controller 206 that may indicate what value of strain the span, S, may correspond to.

However, in some embodiments, the actual length of the span, S, may be computed by analyzing both—strain data; and data corresponding to the position of the shearer 110 since it is possible that the first end 232 of the cable handler 230 (or the service line 202) may sustain the same (or similar) degree of strain at multiple shearer positions along the pan line 138. According to one example, therefore, a strain value indicated by the strain sensor 250 at a shearer position relatively closer to the sub-frame 234 may indicate an actual length of the span, S, that suggests the likelihood of service line dislodgement from the interconnected trays 200, while the same strain value indicated by the strain sensor 250 at a shearer position relatively farther away from the sub-frame 234 may not indicate an actual length of the span, S, that suggests the likelihood of service line dislodgement from the interconnected trays 200.

In yet some embodiments, it is possible for the shearer 110 to be tilted or rotated to some degree about any of the X-axis, Y-axis, or Z-axis. Such tilting and rotation may be deterministic to the increase (or decrease) of the strain sustained by the first end 232 of the cable handler 230. Accordingly, it is possible for the controller 206 to take into account and use data related to the yaw, roll, and pitch of the shearer 110, from the orientation sensor 170, to determine the actual length of the span, S.

With continued reference to FIG. 3, and according to some embodiments of the present disclosure, the parameters of the service line 202 may include an elevation attained by the span, S, of the service line 202 relative to the profile of the pan line 138 (or relative to predetermined heights of the one or more side walls 212, 214 of a corresponding tray 200). In principle, an increase in elevation of any portion of the service line 202 above a certain degree (such as by elevation, E) relative to a side wall 212, 214 of one or more corresponding interconnected trays 200 may commensurately indicate the increased likelihood of dislodgement of the service line 202 from the interconnected trays 200. Accordingly, if the controller 206 gathers from the profile vector history of the pan line 138 of one or more pan line portions with angular deviations (e.g., undulations, bends, curves, and turns) (see example bend 294, FIG. 3) along the pan line 138, and if the controller 206 also gathers a strain data that indicates a strain exerted on or sustained by the service line 202 (or the cable handler 230) to have exceeded beyond a predefined strain threshold, the controller 206 may detect that at least a portion of the service line 202 has risen to an elevation, E, above a predefined elevation threshold (e.g., above one or both the side walls 212, 214 of one or more interconnected trays 200 disposed at the bend 294), and, thus there is an increased likelihood for the service line 202 to dislodge and escape from the interconnected trays 200 at or in proximity to the bend 294.

Referring back to FIG. 2, and according to some embodiments of the present disclosure, the parameters of the service line 202 may include the layers formed in the stack 270 of the service line 202. In principle, a number of layers formed by the stack 270 according to a back-and-forth movement of the service line 202 may mean an increase in an overall elevation of the service line 202, as well (see stack 270 extending above the side walls 212 in FIG. 2). Accordingly, and as with the aforementioned parameter of elevation, the controller 206 may be able to determine the number of layers of the service line 202 by using the stack layer counter 300, as accrued, and accordingly may determine a likelihood of dislodgment of the service line 202 if a number of layers formed by the stack 270 has increased beyond a predefined stack layer threshold.

In an embodiment, while determining an actual length of the span, S, of the service line 202, the controller 206 may first note the presence or formation of any stack (e.g., stack 270) of the service line 202 within the interconnected trays 200 by seeking input from the stack layer counter 300. If a presence of a stack of the service line 202 is determined, the controller 206 may note that while the service line 202 is of a fixed length, the length of any additional layer forming the stack 270 may be removed (or be taken into account) when determining the length of the span, S.

In some embodiments, by knowing the elevation (or height) of the stack 270 and an angle of the shearer 110 relative to an angle of the pan line 138, the controller 206 may detect if there is insufficient clearance of the cable handler 230 (or the service line 202) underneath the tow bracket 246. This is because an insufficient clearance may lead to pinching and/or crushing of the service line 202 with the stack 270, and possibly, a dislodgment of the service line 202 from the interconnected trays 200, as the shearer 110 passes over the stack 270. In one example, the controller 206 may detect a maximum attainable elevation (or height or the number of layers) of the stack 270 that may provide a minimum clearance for the shearer 110 to relatively easily pass over the stack 270. The controller 206 may detect an insufficient clearance for the shearer 110, if there is any further increment to the maximum attainable elevation (or height) of the stack 270 (such as by addition of a new layer of the service line 202 over an existing stack) and may accordingly determine a likelihood of dislodgment of the service line 202.

Figure 4:
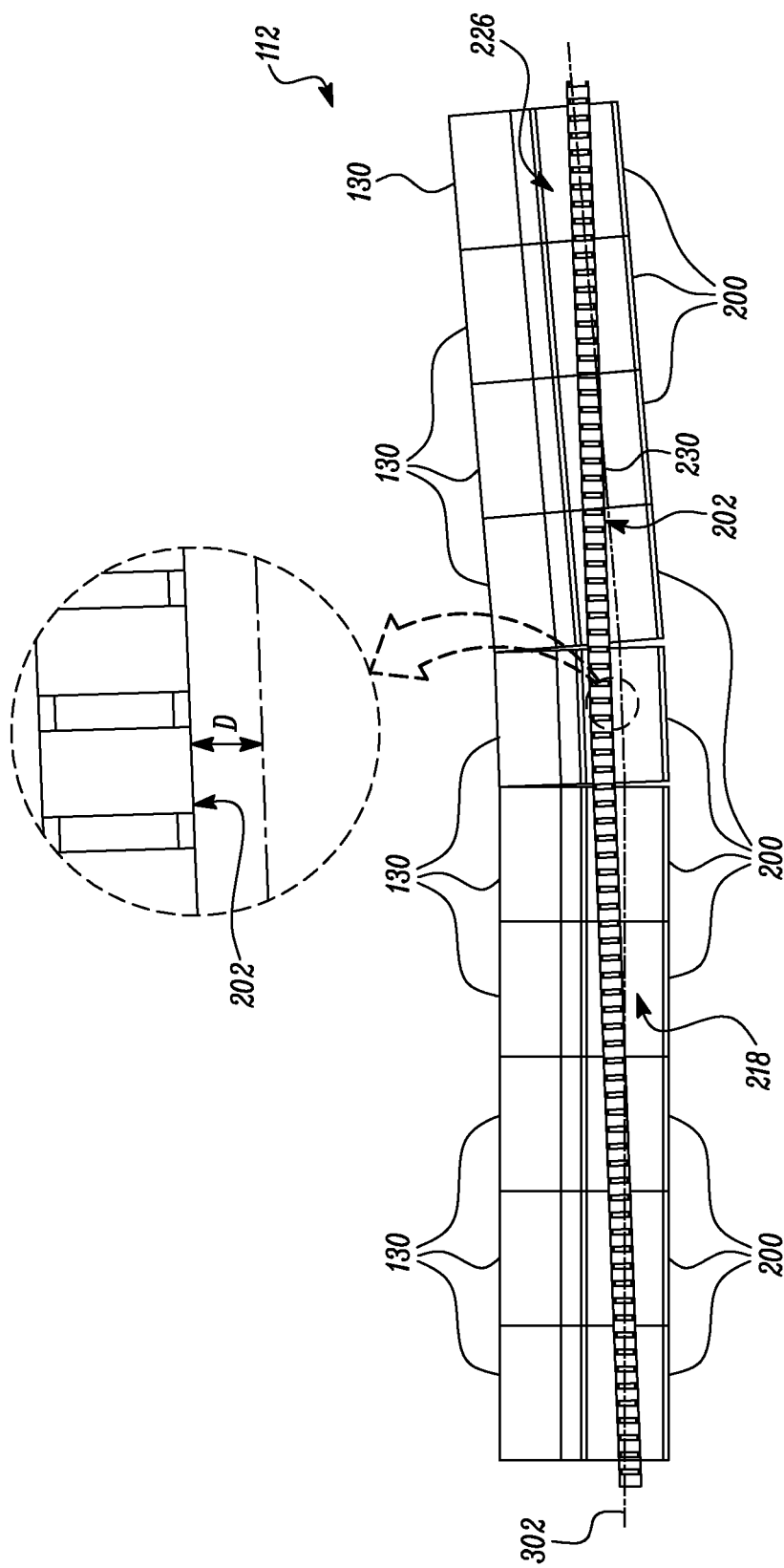

Referring to FIG. 4, and according to some embodiments of the present disclosure, the parameters of the service line 202 may include a value of skew of the service line 202 relative to the profile of the pan line 138. In principle, the angle of yaw of the shearer 110 relative to the pan line 138 is indicative of a skewed variation of the service line 202 relative to the interconnected trays 200. Accordingly, the controller 206 may determine or calculate the value of skew by determining an angle of yaw of the shearer 110 relative to the pan line 138. If the controller 206 gathers and determines an angle of yaw of the shearer 110 to have exceeded beyond a predefined yaw threshold, the controller 206 may also determine that the value of skew of the service line 202 relative to the interconnected trays 200 (determined from the profile vector history of the pan line 138) to have also exceeded beyond a minimum degree (or a predefined skew threshold). For example, based on the increase in the angle of yaw, the controller 206 may determine that the service line 202 is offset and/or displaced from a (virtual) central axis 302 defined by the base wall 210 of the service trough 226 (or the interconnected trays 200), by a distance, D. An increased offset may indicate the likelihood of dislodgement and escape of the service line 202 from the interconnected trays 200.

Figure 5:
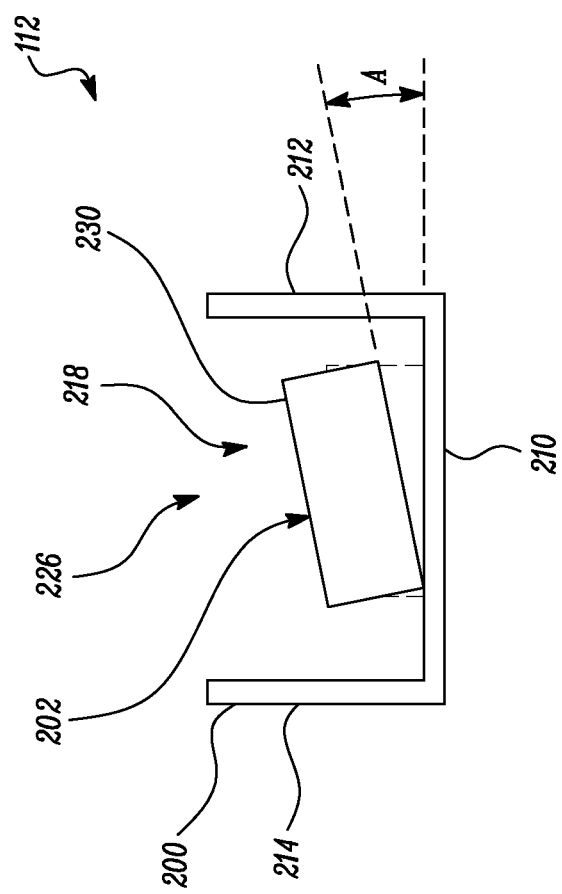

Referring to FIG. 5, and according to some embodiments of the present disclosure, the parameters of the service line 202 may include an angle of twist of the service line 202 relative to the profile of the pan line 138. In principle, the angle of roll of the shearer 110 relative to the pan line 138 is indicative of a twisted variation of the service line 202 relative to the interconnected trays 200. Accordingly, the controller 206 may detect the angle of twist by determining an angle of roll of the shearer 110 relative to the pan line 138. If the controller 206 gathers and determines an angle of roll of the shearer 110 to have exceeded beyond a predefined roll threshold, the controller 206 may also determine that the angle of twist of the service line 202 relative to the interconnected trays 200 (determined from the profile vector history of the pan line 138) to have also exceeded beyond a minimum degree (predefined twist threshold). For example, based on the increase in the angle of roll, the controller 206 may determine that the service line 202 is at an angular offset 'A' relative to the base wall 210 of the service trough 226 (or of the interconnected trays 200). An increased angular offset 'A' may indicate the likelihood of dislodgement and escape of the service line 202 from the interconnected trays 200.

In some embodiments, the controller 206 is configured to compute an escape factor based on one or more of the parameters discussed above, and may determine the likelihood of service line dislodgement only if a minimum number of aforementioned parameters have exceeded the corresponding predefined thresholds (or the predefined parameter thresholds). For example, if the minimum number of parameters to have exceeded should be more than or equal to 3, and if the controller 206 detects that only 2 of the parameters have exceeded their corresponding predefined threshold (or predefined parameter threshold), then, in such a case, the controller 206 may refrain from determining the likelihood of service line dislodgement and escape, and thus may not send any corresponding notification to the output device 272. However, if more than 2 parameters of the aforementioned parameters have correspondingly exceeded their predefined thresholds (or predefined parameter thresholds), the controller 206 may determine and indicate (or notify), via the output device 272, that a possibility and/or a likelihood of dislodgement and escape of at least a portion of the service line 202 is relatively high.

In some embodiments, it is possible for the controller 206 to transmit the data related to the likelihood of service line dislodgement to a remote server or a computer from where a machine supervisor may take note of the indication, and accordingly may initiate suitable actions, such as to temporarily suspend machine operations, evacuate one or more workers from site, etc., until the service line 202 has been restored of all possible irregularities (like being cleared of all the aforementioned factors that would have led to the service line's dislodgement and escape from the interconnected trays 200). With the aspects of the present disclosure determining the likelihood of (or pre-emptively predicting) service line dislodgement from the interconnected trays 200, the service line 202 is prevented from dislodgement and unravelling, and, accordingly, the environment within the longwall mining machine 100 becomes a safer workplace for all stakeholders. Further, a service life of the service line 202 is increased and unnecessary repairs, effort, and costs, which may have arisen because of service line dislodgment from the interconnected trays 200, may be effectively avoided. Such an application also increases machine life and productivity.

It will be apparent to those skilled in the art that various modifications and variations can be made to the system of the present disclosure without departing from the scope of the disclosure. Other embodiments will be apparent to those skilled in the art from consideration of the specification and practice of the system disclosed herein. It is intended that the specification and examples be considered as exemplary only, with a true scope of the disclosure being indicated by the following claims and their equivalent.

What is claimed is:

1. A cable handling system for a longwall mining machine, the longwall mining machine including a shearer configured to move along a pan line to mine material along a mine face, the cable handling system comprising:
    a service line configured to carry one or more supply lines to the shearer for facilitating shearer operation;
    a plurality of interconnected trays to accommodate the service line; and
    a controller configured to:
        determine a profile of the pan line;
        detect one or more parameters associated with the service line in relation to the profile of the pan line; and
        determine a likelihood of at least a portion of the service line dislodging from the plurality of interconnected trays based on one or more value(s) by which the one or more parameters exceed(s) a predefined threshold.

2. The cable handling system of claim 1, wherein the profile of the pan line is determined based on a position and a movement of the shearer along the pan line.

3. The cable handling system of claim 1, wherein the one or more parameters include a variation in a span of the service line relative to a corresponding part of the pan line.

4. The cable handling system of claim 3 further including a strain sensor to detect a strain exerted on the service line during shearer movement,
    wherein the controller is configured to detect the variation by determining the strain exerted on the service line.

5. The cable handling system of claim 1, wherein the one or more parameters include an angle of twist of the service line relative to the profile of the pan line.

6. The cable handling system of claim 5, wherein the controller is configured to detect the angle of twist by determining an angle of roll of the shearer relative to the pan line,
    wherein the angle of roll of the shearer relative to the pan line is indicative of a twisted variation of the service line relative to the plurality of interconnected trays.

7. The cable handling system of claim 1, wherein the one or more parameters include a value of skew of the service line relative to the profile of the pan line.

8. The cable handling system of claim 7, wherein the controller is configured to calculate the value of skew by determining an angle of yaw of the shearer relative to the pan line,
    wherein the angle of yaw of the shearer relative to the pan line is indicative of a skewed variation of the service line relative to the plurality of interconnected trays.

9. The cable handling system of claim 1, wherein the one or more parameters include an elevation of the service line relative to the profile of the pan line.

10. The cable handling system of claim 9 further including a strain sensor to detect a strain exerted on the service line during shearer movement,
    wherein the controller is configured to detect the elevation by determining the strain exerted on the service line.

11. The cable handling system of claim 9 further including a counter to detect a number of layers formed by a stack of the service line during shearer movement for mining the material along the mine face,
    wherein the controller is configured to detect the elevation by determining the number of layers formed.

12. A longwall mining machine, comprising:
    a pan line;
    a shearer configured to move along the pan line to mine material along a mine face;
    a service line configured to carry one or more supply lines to the shearer for facilitating shearer operation;
    a plurality of interconnected trays to accommodate the service line; and
    a controller configured to:
        determine a profile of the pan line;
        detect one or more parameters associated with the service line in relation to the profile of the pan line; and determine a likelihood of at least a portion of the service line dislodging from the plurality of interconnected trays based on one or more value(s) by which the one or more parameters exceed(s) a predefined threshold.

13. The longwall mining machine of claim 12, wherein the one or more parameters include a variation in a span of the service line relative to a corresponding part of the pan line.

14. The longwall mining machine of claim 13 further including a strain sensor to detect a strain exerted on the service line during shearer movement,
   wherein the controller is configured to detect the variation by determining the strain exerted on the service line.

15. The longwall mining machine of claim 12, wherein the one or more parameters include an angle of twist of the service line relative to the profile of the pan line,
   wherein the controller is configured to detect the angle of twist by determining an angle of roll of the shearer relative to the pan line.

16. The longwall mining machine of claim 12, wherein the one or more parameters include a value of skew of the service line relative to the profile of the pan line,
   wherein the controller is configured to calculate the value of skew by determining an angle of yaw of the shearer relative to the pan line.

17. The longwall mining machine of claim 12, wherein the one or more parameters include an elevation of the service line relative to the profile of the pan line.

18. The longwall mining machine of claim 17 further including a tow bracket disposed between the shearer and the service line, and a strain sensor mounted to the tow bracket, the strain sensor configured to detect a strain exerted on the service line during shearer movement,
   wherein the controller is configured to detect the elevation by determining the strain exerted on the service line.

19. The longwall mining machine of claim 17 further including a counter to detect a number of layers formed by a stack of the service line during shearer movement for mining the material along the mine face,
   wherein the controller is configured to detect the elevation by determining the number of layers formed.

20. A method for operating a cable handling system of a longwall mining machine having a shearer movable along a pan line to mine material along a mine face, the cable handling system including a service line configured to carry one or more supply lines to the shearer for facilitating shearer operation, and a plurality of interconnected trays to accommodate the service line, the method comprising:
   determining, by a controller, a profile of the pan line based on a position and a movement of the shearer along the pan line;
   detecting, by the controller, one or more parameters associated with the service line in relation to the profile of the pan line; and
   determining, by the controller, a likelihood of at least a portion of the service line dislodging from the plurality of interconnected trays based on one or more value(s) by which the one or more parameters exceed(s) a predefined threshold.

* * * * *